UNITED STATES PATENT OFFICE.

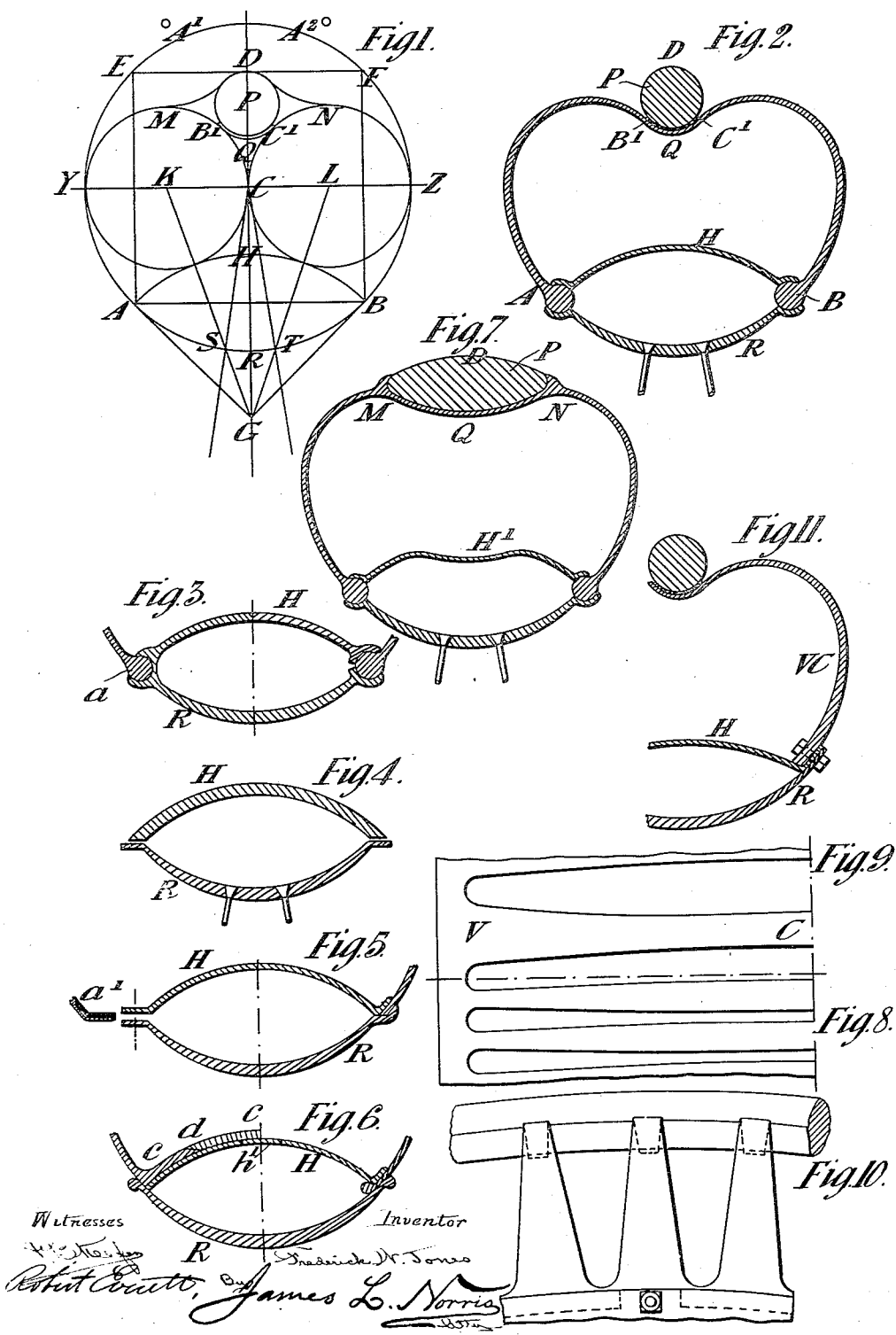

FREDERICK WARNER JONES, OF LONDON, ENGLAND, ASSIGNOR OF ONE-TENTH TO EDMUND WALTER THURGAR, OF SAME PLACE.

WHEEL FOR CYCLES OR OTHER VEHICLES.

SPECIFICATION forming part of Letters Patent No. 632,574, dated September 5, 1899.

Application filed February 14, 1899. Serial No. 705,507. (No model.)

*To all whom it may concern:*

Be it known that I, FREDERICK WARNER JONES, a citizen of England, residing at 168 Dashwood House, New Broad street, in the city of London, England, have invented certain new and useful Improvements in the Wheels and Tires of Cycles or other Road-Vehicles, (for which application for a patent has been made in Great Britain, dated July 15, 1898, No. 15,511,) of which the following is a specification.

My invention relates to an improved construction of rims and tires for cycle and other wheels.

The main feature of my invention consists in constructing the tire of an approximate heart-shaped sectional form whereby the undue strain and friction to which the material of ordinary pneumatic tires are subjected is obviated, and I construct such tire, as also the wheel-rim, in such manner that all parts thereof have a definite geometrical proportion to each other, as I will explain with reference to the accompanying drawings, in which—

Figure 1 is a sectional diagram showing the geometrical proportions of a wheel-tire constructed in accordance with my invention. Fig. 2 is a transverse section of a wheel tire and rim. Fig. 3 is a detail section showing a modified form of rim. Figs. 4, 5, and 6 are detail sections of a rim, showing further modifications. Fig. 7 is a transverse section of a tire and rim, showing a slight change in the form of the ring. Figs. 8, 9, 10, and 11 are detail views of further modifications.

Assuming the width of the rim to be represented by the line A B, I draw a square A E F B thereon, and from the point of intersection C of the diagonals thereof I describe a circle A Y E F Z B, touching the corners of the square. From the points A and B, I draw tangents A G and B G, which give an angular form A G B, that may represent the section of the rim, or preferably for cycles I take the arc A R B of the said circle for the rim. From the point of intersection G of the tangents as a center I draw the arc H, passing through A and B, which arc is consequently identical with arc A R B and represents the section of an outer rim, which may either be formed in one with the inner rim A R B or may be a separate band of steel or other suitable material. I divide the radii Y C and C Z of the circle into two parts, giving the points K and L, and from these points as centers I describe with radii C K and C L the equal circles Y M C and Z N C. From a center P, I describe a circle touching line E F at D and touching arcs Y M C and Z N C, respectively, with the arc B' Q C'. The compound curved line A Y M B' Q C' N Z B then constitutes the approximately heart-shaped configuration of the elastic tire, which may either be formed as an inflated caoutchouc tire or of steel bands, as hereinafter described.

In the hollow of the tire, between the apices M and N of the tire, I first fit a light concave ring B' Q C' of steel or other rigid material, and upon this I fit a ring D P Q of solid caoutchouc or other suitable more or less hard material, which rim and ring serve to maintain the heart shape of the tire; also, when the tire is subject to the pressure of a load on the ground it will be seen that the ring D will first be pressed inward, after which the two apices M and N will come in contact with the ground, thus affording three definite points of contact at some distance apart between the tire and the ground. If the ring D be made of hard caoutchouc or other non-expansible material the concave ring B' Q C' can be dispensed with. In some cases I do not make the ring D of circular section, but extend it laterally by curves M D and N D, struck from centers A' A², or I employ the modified form M D N Q. (Shown at Fig. 7.) When the pneumatic tire is more or less deflated, the part M D N Q will bear against the outer rim H, which may with advantage be made with an inward bulge, as at H', Fig. 7, into which the said part fits, thus preventing any lateral shifting thereof which might otherwise take place. It will be seen that in the case of pneumatic tires, when the tire is inflated, the outer rim H in being acted upon by the air-pressure will tend to flatten out and will consequently put a transverse tensional strain on the inner rim, which must consequently be made of sufficient strength to withstand such strain. The outer rim may, however, also be made straight instead of curved, as represented by the line A B, Fig. 1. In the case of pneumatic tires I prefer to fix the tire to the rim by a modified form of ball-and-socket joint in which the ball is replaced by a cylinder, a cylindrical swelling being formed on each edge of the tire, fitting a corresponding cylindrical groove on the outer edge of the rim; but the tire may also be formed with swelled edges of different form and secured, as will be presently described.

Fig. 2 shows a section of the tire and rim constructed according to the diagram Fig. 1, in which the cylindrical edges A B of the tire (in which may be embedded wires) are held in grooves formed by the combined hollowed edges of the inner and outer rims, as shown.

According to the modification of the rim shown at the left hand of Fig. 3 the inner and outer rims are formed in one piece, and the groove for the reception of the cylindrical edge $a$ of the tire is formed externally thereto. At the right-hand side of this figure the inner and outer rim are shown separate, each part being formed with part of the groove.

At Figs. 4, 5, and 6 the inner and outer rim are formed with flat flanges, between which the edges of the tire are held. At the left hand of Fig. 5 the edge of the tire is formed with a rigid angular piece $a'$, which may or may not be covered with the caoutchouc of the tire, and which may be secured between the flanges of the inner and outer rim by means of screws passing through the three parts. On the left hand of Fig. 6 the tire is formed with a thick caoutchouc base $c\ c$, fitting onto the outer rim H, and either formed entirely closed or with an air-tight lap-joint $d$, the angular edge of the tire being by preference thickened by an internal rounding, as shown. The caoutchouc base is made of sufficient thickness to prevent blowing through holes that have to be made at $h$ in the outer rim when this is made in one piece with the inner rim for the introduction of the spokes.

The spokes of the wheel may be fixed in the inner rim, as shown at Figs. 2 and 4. Their correct position may be determined as follows: Referring to Fig. 1, if lines be drawn from point G to centers K and L and lines be then drawn from center C through the points S and T at which the lines G K and G L intersect rim A R B, then lines C S and C T will give the proper angular direction for the spokes and S and T the points of their attachment to the inner rim.

If the tire be made of steel instead of caoutchouc, I afford it the necessary resiliency by making it of laminar form, as at Figs. 9, 10, and 11. For this purpose I stamp a strip of sheet-steel with interstices, as shown at Fig. 8, leaving the two edges continuous for fastening the same to the rim, the openings being preferably made narrower at the middle than at the ends, so that when bent into the heart shape, as at Figs. 10 and 11, the openings will become of about the same width throughout. Such steel tires may be employed, either as a covering for an inflated tire, in which case care should be taken that the openings are not large enough for the inflated tire to be bulged through them, and also that their edges are not sharp, so as not to cut the caoutchouc tire.

A form of spring V C to be used for cycles when the tire is not pneumatic is shown in Figs. 9, 10, and 11. These springs can be made either separately of suitable strength or continuously as a part of the tire joined to the rim or in one piece therewith and be used with or without the inner band-rim A H B, in which case the heart-spring would take the form of, Fig. 1, G A Y M Q N Z B G, united at G or at S T and fixed, preferably, by the spoke-heads at the angular point G, or at S T if the rim be curved, as A R B instead of as A G B. In all cases the springs must be in proper tension in accordance with the weight carried, and this may be done by the light rim B' Q C' being made of a sufficiently small radius. The concave ring B' Q C', Fig. 1, must be joined to the several springs at their respective points Q and be of sufficient depth to retain the rubber ring Q B' D C. The lateral extensions B' M D and D C' Q of the ring are not required in this form of construction. For pneumatic tires suitable inflation-holes are placed in the rims and tires where necessary.

When the steel tire is employed without an inflated tire, it is made with a sufficiently-thickened base to give the requisite strength and is there fixed, preferably, by screws to the rim A B, as shown at Fig. 11.

Having thus described the nature of this invention and the best means I know of carrying the same into practical effect, I claim—

In a wheel for a cycle or other vehicle, a rim consisting of inner and outer concave and convex parts, each having its edges provided with grooves, a pneumatic tire having thickened edges secured in said grooves, a trough-shaped hoop of non-expansible material lying in a groove in the middle of the tread of the tire, and a solid ring of caoutchouc or other suitable material fitted in the trough-shaped hoop and of a diameter to project beyond the tread of the tire on each side of said grooves, substantially as described.

In testimony whereof I have hereunto set my hand in presence of two subscribing witnesses.

FREDERICK WARNER JONES.

Witnesses:
CHAS. D. ABEL,
GERALD L. SMITH.